(12) United States Patent
Akazawa et al.

(10) Patent No.: US 10,427,733 B2
(45) Date of Patent: Oct. 1, 2019

(54) CRAWLER DEVICE AND TRAVELING APPARATUS

(71) Applicant: TOPY KOGYO KABUSHIKI KAISHA, Tokyo (JP)

(72) Inventors: Takuma Akazawa, Tokyo (JP); Shingo Tsukui, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 54 days.

(21) Appl. No.: 15/735,544

(22) PCT Filed: Jul. 4, 2016

(86) PCT No.: PCT/JP2016/069781
§ 371 (c)(1),
(2) Date: Dec. 11, 2017

(87) PCT Pub. No.: WO2017/006909
PCT Pub. Date: Jan. 12, 2017

(65) Prior Publication Data
US 2018/0170461 A1 Jun. 21, 2018

(30) Foreign Application Priority Data
Jul. 6, 2015 (JP) .................................. 2015-135592

(51) Int. Cl.
*B62D 55/08* (2006.01)
*B62D 55/18* (2006.01)
(Continued)

(52) U.S. Cl.
CPC ........... *B62D 55/065* (2013.01); *B62D 55/04* (2013.01); *B62D 55/084* (2013.01); *B62D 55/14* (2013.01); *B62D 55/24* (2013.01)

(58) Field of Classification Search
CPC ..... B60B 19/12; B60B 19/125; B60B 19/003; B60B 19/00; B62D 57/00; B62D 55/24;
(Continued)

(56) References Cited

U.S. PATENT DOCUMENTS 2,448,222 A * 8/1948 Jones ...................... B60B 11/06
152/10
2,751,259 A * 6/1956 Bonmartini ........... B60F 3/0015
180/6.7
(Continued)

FOREIGN PATENT DOCUMENTS

JP 63-270 B2 1/1988
JP 2007-191153 A 8/2007
(Continued)

OTHER PUBLICATIONS

International Search Report (ISR) for corresponding International Application No. PCT/JP2016/069781 (English version).
(Continued)

*Primary Examiner* — Anne Marie M Boehler
(74) *Attorney, Agent, or Firm* — Thomas B. Ryan; Jodi A. Reynolds, Esq.; Harter Secrest & Emery LLP

(57) ABSTRACT

A crawler device 2 includes a crawler unit 5. The crawler unit 5 includes a first support 10 extending along a first rotational axis L1, a pair of crawler structures 20A, 20B mounted on the first support 10 and a pair of ground contacting structures 30A, 30B mounted on the first support 10. The pair of ground contacting structures 30A, 30B are arranged outside of the pair of crawler structures 20A, 20B in a direction in which the pair of crawler structures 20A, 20B are opposed to each other. The crawler unit 5 is supported by second supports 41, 42 such that the crawler unit 5 is rotatable about the first rotational axis L1. An outer periphery of the crawler unit 5 having a circular cylindrical configuration includes first zones Z1 occupied by the pair of
(Continued)

crawler structures 20A, 20B and second zones Z2 occupied by the pair of ground contacting structures 30A, 30B alternately arranged in a circumferential direction.

11 Claims, 10 Drawing Sheets

(51) Int. Cl.
*B62D 55/065* (2006.01)
*B62D 55/14* (2006.01)
*B62D 55/24* (2006.01)
*B62D 55/04* (2006.01)
*B62D 55/084* (2006.01)

(58) Field of Classification Search
CPC ...... B62D 55/18; B62D 55/04; B62D 55/084; B62D 55/14; B62D 55/65
USPC .......... 180/9, 9.1, 9.44, 10, 21, 7.1; 301/5.1
See application file for complete search history.

(56) References Cited

U.S. PATENT DOCUMENTS

| | | | | |
|---|---|---|---|---|
| 4,981,188 | A * | 1/1991 | Kadela | B60F 3/0015 180/9.25 |
| 5,186,270 | A * | 2/1993 | West | B25J 5/005 180/6.62 |
| 6,179,073 | B1 * | 1/2001 | Chhabra | B62D 55/08 180/6.7 |
| 9,004,200 | B2 * | 4/2015 | Ben-Tzvi | B62D 55/02 180/6.7 |
| 9,540,060 | B2 * | 1/2017 | Hutson | B62D 55/20 |
| 2007/0145820 | A1 | 6/2007 | Hirose et al. | |
| 2009/0095544 | A1 * | 4/2009 | Carlson | A63H 17/36 180/9.44 |
| 2009/0188729 | A1 * | 7/2009 | Berry | B60B 19/14 180/7.1 |
| 2009/0256280 | A1 | 10/2009 | Hirose et al. | |
| 2018/0186414 | A1 * | 7/2018 | Akazawa | B62D 55/065 |

FOREIGN PATENT DOCUMENTS

| | | |
|---|---|---|
| JP | 2009-241916 A | 10/2009 |
| JP | 2014-51221 A | 3/2014 |
| JP | 2014-193707 A | 10/2014 |

OTHER PUBLICATIONS

International Preliminary Report on Patentability for PCT/JP2016/069781 dated Jul. 26, 2016 (English translation).

* cited by examiner

CRAWLER DEVICE AND TRAVELING APPARATUS

FIELD OF THE INVENTION

The present invention relates to a crawler device that can be moved in two directions and a traveling apparatus provided with multiple such crawler devices.

BACKGROUND OF THE INVENTION

A robot (traveling apparatus) disclosed in Patent Document 1 includes a robot body (body of the traveling apparatus) and a pair of crawler devices extending in a front-rear direction of the body disposed on the left and right of the body. Each of the crawler devices includes front and rear wheels and a belt (endless elongated member) wrapped around the wheels.

The robot having the features mentioned above can be moved forward or backward by driving the left and right crawler devices in the same direction at the same speed. The robot can make a turn to the left or right drawing a curve by driving the left and right crawler devices at different speeds. Moreover, the robot can make a pivot turn (turning in place without moving) by driving the left and right crawler devices in different directions.

The robot cannot change directions by pivot turning at a corner of a narrow passage curving at a right angle. The robot cannot change directions by pivot turning on an uneven ground either because a resistance of the ground interferes with rotational driving of the crawler devices.

Moreover, in a case where a destination is in an oblique direction, the robot may not be able to be moved linearly to the destination, and therefore may not be able to reach the destination accurately.

Patent Document 2 discloses a crawler device that can be moved in two directions. The crawler device includes a crawler unit rotatable about a rotational axis extending in a first direction. The crawler unit includes a support extending in the first direction and a pair of crawler structures mounted to the support and opposed to each other with the rotational axis extending therebetween.

Each of the pair of crawler structures includes a pair of wheels disposed away from each other in the first direction of the rotational axis, an endless elongated member wrapped around the wheels and a multitude of tread lugs attached to the endless elongated member.

The crawler device can be moved in the first direction by driving the pair of crawler structures. A mode of moving in this manner is referred to as "crawler moving" hereinafter.

The crawler device can be moved in a second direction orthogonal to the first direction by the crawler unit's being rotated about the rotational axis and rolling in the second direction. A mode of moving in this manner is referred to as "moving by rolling" hereinafter.

A robot provided with the crawler device of the Patent Document 2 can change directions of movement from the first direction to the second direction and from the second direction to the first direction not by pivot turning but by selecting between the crawler moving and the moving by rolling.

Moreover, the robot can be moved linearly in any oblique direction by performing the crawler moving and the moving by rolling at the same time. A mode of moving in this manner is referred to as "oblique moving" hereinafter.

PRIOR ART DOCUMENTS

Patent Documents

Patent Document 1: Japanese Unexamined Patent Application Publication No. 2007-191153
Patent Document 2: Japanese Unexamined Patent Application Publication No. 2009-241916

SUMMARY OF THE INVENTION

Problem to be Solved by the Invention

In the crawler device of Patent Document 2, in order to enable the crawler unit to roll, the crawler unit is provided with a circular cylindrical configuration by the pair of crawler structures. Specifically, the tread lugs of the pair of crawler structures extend in a circumferential direction in a circular-arc configuration over a wide angular range (angular range of almost 90 degrees) from fixing positions to the endless elongated member, and outer surfaces of the tread lugs alone provide an outer periphery of the crawler unit with the circular cylindrical configuration. Since the tread lugs extend in the circumferential direction supported at one end only, a great bending load is repeatedly applied to the tread lugs every time the tread lugs contact the ground at portions away from the fixing positions. This causes the tread lugs and the endless elongated member to be deteriorated in a short period of time. Moreover, since strength of the tread lugs is limited, the crawler device cannot support a heavy load.

Means for Solving the Problems

To solve the problems mentioned above, the present invention provides a crawler device including: a crawler unit including a first support extending along a first rotational axis and a pair of crawler structures extending in a direction of the first rotational axis and disposed on the first support, the crawler structures opposed to each other with the first rotational axis extending therebetween; and at least one second support supporting the crawler unit such that the crawler unit is rotatable about the first rotational axis, wherein the crawler unit further comprises a pair of ground contacting structures disposed on the first support, the pair of ground contacting structures are disposed outside of the pair of crawler structures in a direction in which the pair of crawler structures are opposed to each other, the pair of crawler structures and the pair of ground contacting structures cooperate to provide the crawler unit with a circular cylindrical configuration about the first rotational axis, and an outer periphery of the crawler unit has first zones occupied by the pair of crawler structures and second zones occupied by the pair of ground contacting structures, the first zones and the second zones alternately arranged in a circumferential direction.

According to the features mentioned above, the crawler device can be moved in two directions. Therefore, the crawler device can change directions without scraping the ground, thus improving a moving performance thereof.

Since the pair of crawler structures and the pair of ground contacting structures cooperate to provide the outer periphery of the crawler unit with the circular cylindrical configuration, an angular range occupied by the pair of crawler structures in the outer periphery of the crawler unit can be reduced. Therefore, too much bending force is not applied to the crawler structures, and thus a durability of the crawler structures can be enhanced. Moreover, the crawler device can support a heavy load.

Preferably, each of the pair of crawler structures includes a pair of wheels spaced from each other in the direction of the first rotational axis, an endless elongated member wrapped around the pair of wheels and a multitude of tread lugs attached to the endless elongated member, the pair of wheels are supported by the first support such that the wheels are respectively rotatable about second rotational axes extending parallel to each other in a direction orthogonal to the first rotational axis, the pair of crawler structures opposed to each other in the direction of the second rotational axes, and outer surfaces of the tread lugs and outer surfaces of the ground contacting structures cooperate to provide the crawler unit with a circular cylindrical outer periphery.

According to the features mentioned above, since an extension of the tread lugs from the endless elongated member in a circumferential direction is short, the tread lugs can be securely supported, and durability of the tread lugs and the endless elongated member can be enhanced.

Preferably, the first support includes a pair of side plates opposed to each other with the first rotational axis extending therebetween, the pair of crawler structures are disposed between the pair of side plates, and one or a plurality of ground contacting members constituting the ground contacting structures are fixed to outer surfaces of the pair of side plates.

According to the features mentioned above, use of the side plates enables the ground contacting structures to be securely supported without interference with the crawler structures.

Preferably, the plurality of ground contacting members are arranged spaced from one another in the direction of the first rotational axis, and an outer surface of each of the ground contacting members includes a circular-arc surface about the first rotational axis.

According to the features mentioned above, the ground contacting structures can be simplified.

Preferably, a recess is formed in the outer surface of the ground contacting member. According to the features mentioned above, when the crawler unit is rollingly moved over an obstacle, the recess of the ground contacting member catches the obstacle, and therefore, the crawler unit can be smoothly moved over the obstacle.

Preferably, a pair of second supports are provided spaced from each other in the direction of the first rotational axis, and the crawler unit is rotatably supported by the pair of second supports at opposite end portions of the crawler unit. According to the features mentioned above, the crawler unit can be securely supported at opposite ends.

Of the pair of second supports, one second support that supports one end portion of the crawler unit includes a base and a torque transmitting member supported by the base such that the torque transmitting member is rotatable about the first rotational axis, the torque transmitting member is connected to the first support such that the torque transmitting member is not rotatable about the first rotational axis relative to the first support, and the crawler device further comprises a rolling actuator that rotationally drives the torque transmitting member of the one second support and a crawler actuator that rotationally drives the pair of crawler structures at the same time in the same direction.

According to the features mentioned above, the crawler unit supported at the opposite ends can be moved without human power by using the rolling actuator and the crawler actuator.

The crawler unit is supported by the second support only at one end portion thereof, the second support includes a base and a torque transmitting member supported by the base such that the torque transmitting member is rotatable about the first rotational axis, the torque transmitting member is connected to the first support such that the torque transmitting member is not rotatable about the first rotational axis relative to the first support, and the crawler device further comprises a rolling actuator that rotationally drives the torque transmitting member of the second support and a crawler actuator that rotationally drives the pair of crawler structures at the same time in the same direction.

According to the features mentioned above, the crawler unit supported at one end can be moved without human power by using the rolling actuator and the crawler actuator.

The crawler device further includes a third support that supports the second support such that the second support is rotatable about a third rotational axis that is orthogonal to the first rotational axis and a flipper actuator that rotationally drives the second support.

According to the features mentioned above, since the crawler unit is used as a flipper, the crawler device can be easily moved over obstacles such as a step.

A traveling apparatus according to one aspect of the present invention includes a body and at least one pair of the crawler devices supported at the opposite ends, wherein the crawler units of the pair of crawler devices are disposed parallel to each other and spaced from each other in a direction orthogonal to the first rotational axis, and the pair of second supports of each of the crawler devices are supported by the body.

A traveling apparatus according to another aspect of the present invention includes a body and two pairs of the crawler devices supported at one end, wherein one pair of crawler devices and the other pair of crawler devices are spaced from each other in the direction of the first rotational axis, the crawler devices of each of the pair of crawler devices are spaced from each other in a direction orthogonal to the first rotational axis, the third rotational axes of the pair of crawler devices are arranged along a same line, and the third support of each of the crawler devices is supported by the body.

Advantageous Effects of the Invention

According to the present invention, the crawler device can change directions without scraping the ground. Moreover, too much bending force is not applied to the pair of crawler structures, and the durability of the crawler structures can be enhanced.

MODE FOR CARRYING OUT THE INVENTION

A robot (traveling apparatus) having crawler devices according to a first embodiment of the present invention incorporated therein will be described hereinafter with reference to FIGS. 1 to 6. Direction X (first direction) and direction Y (second direction) orthogonal to each other are defined in FIGS. 1 and 4.

Figure 1:
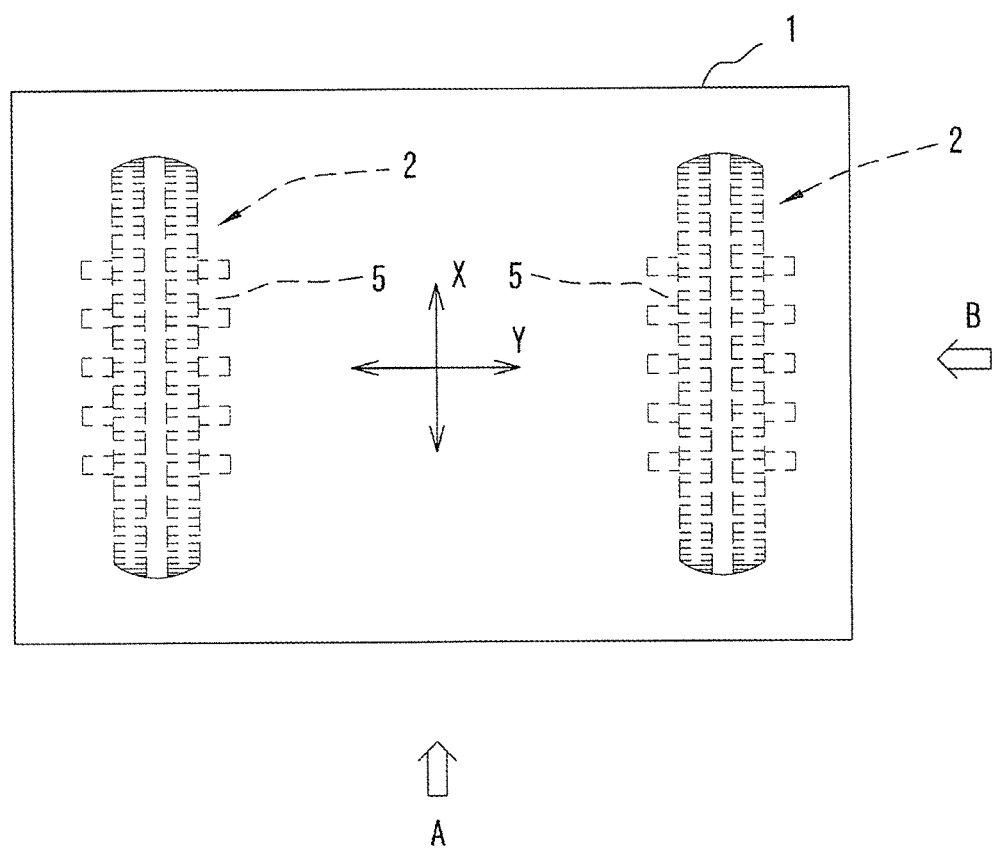
FIG. 1 is a plan view of a robot (traveling apparatus) having crawler devices according to a first embodiment of the present invention incorporated therein, shown with some features thereof omitted.
Figure 2:
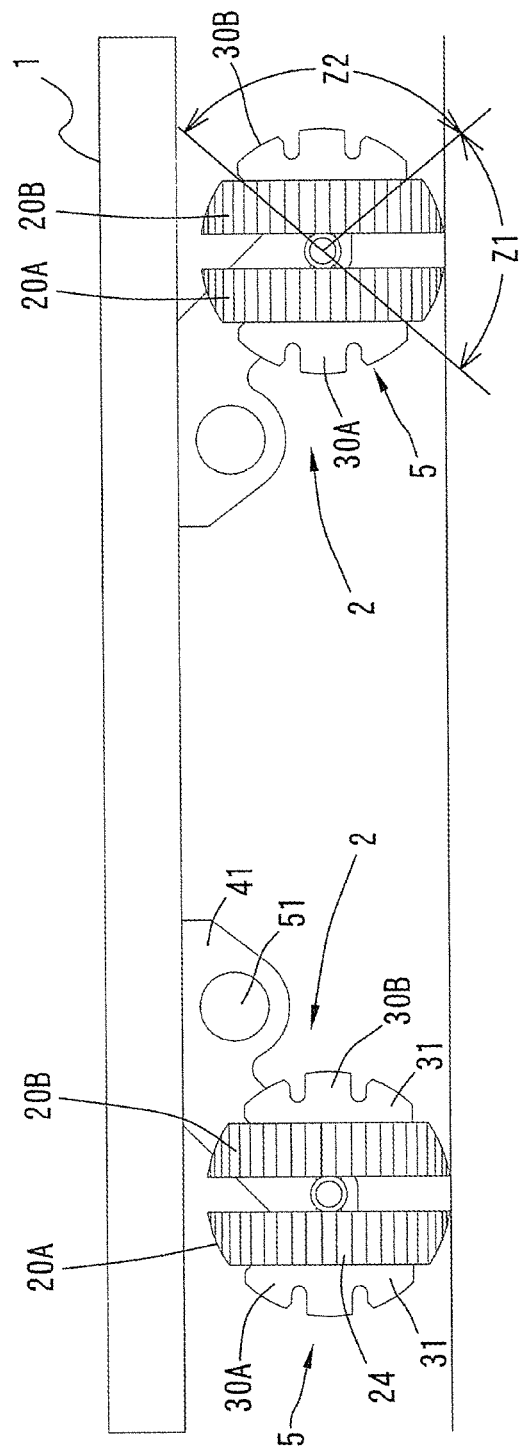
FIG. 2 is a side view of the robot of FIG. 1 viewed from a direction of arrow A, shown with some features thereof omitted.
Figure 4:
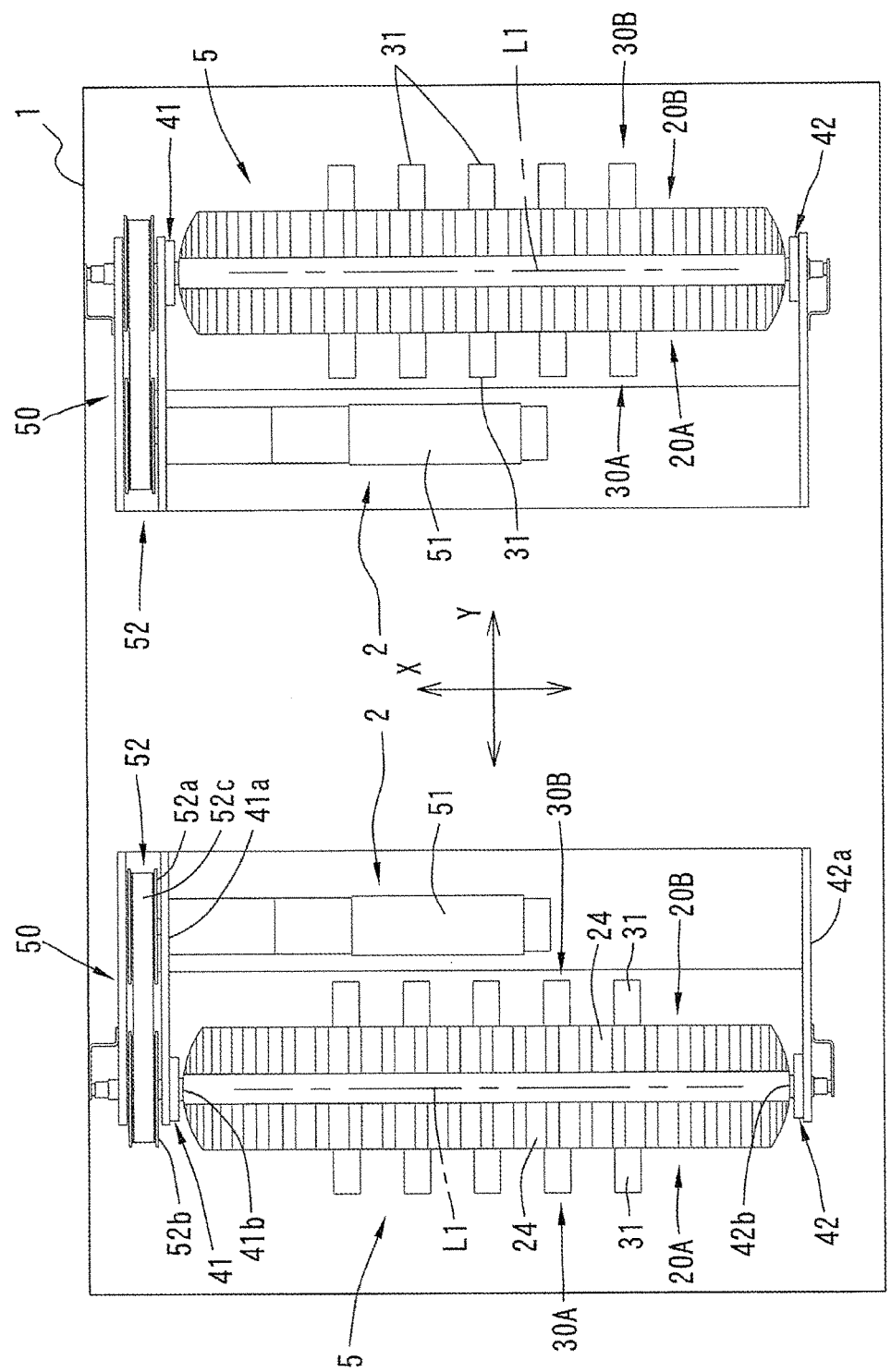
FIG. 4 is a bottom view of the robot.

As shown in FIGS. 1, 2 and 4, the robot includes a robot body 1 (body of the traveling apparatus). Observation devices such as a video camera and a work arm that can be used for various works as necessary or the like are mounted on the robot body 1. A transceiver and a battery are also mounted on the robot body 1. Movement of the robot is controlled by control signals from a remote controller that is not shown.

A pair of crawler devices 2, 2 are mounted on an under surface of the robot body 1. The crawler devices 2, 2 are spaced from each other in the direction Y.

Each of the crawler devices 2, 2 includes a crawler unit 5 having an elongated configuration extending in the direction X. The crawler unit 5 is rotatable about a first rotational axis L1 extending in the direction X as will be described later.

Figure 5:
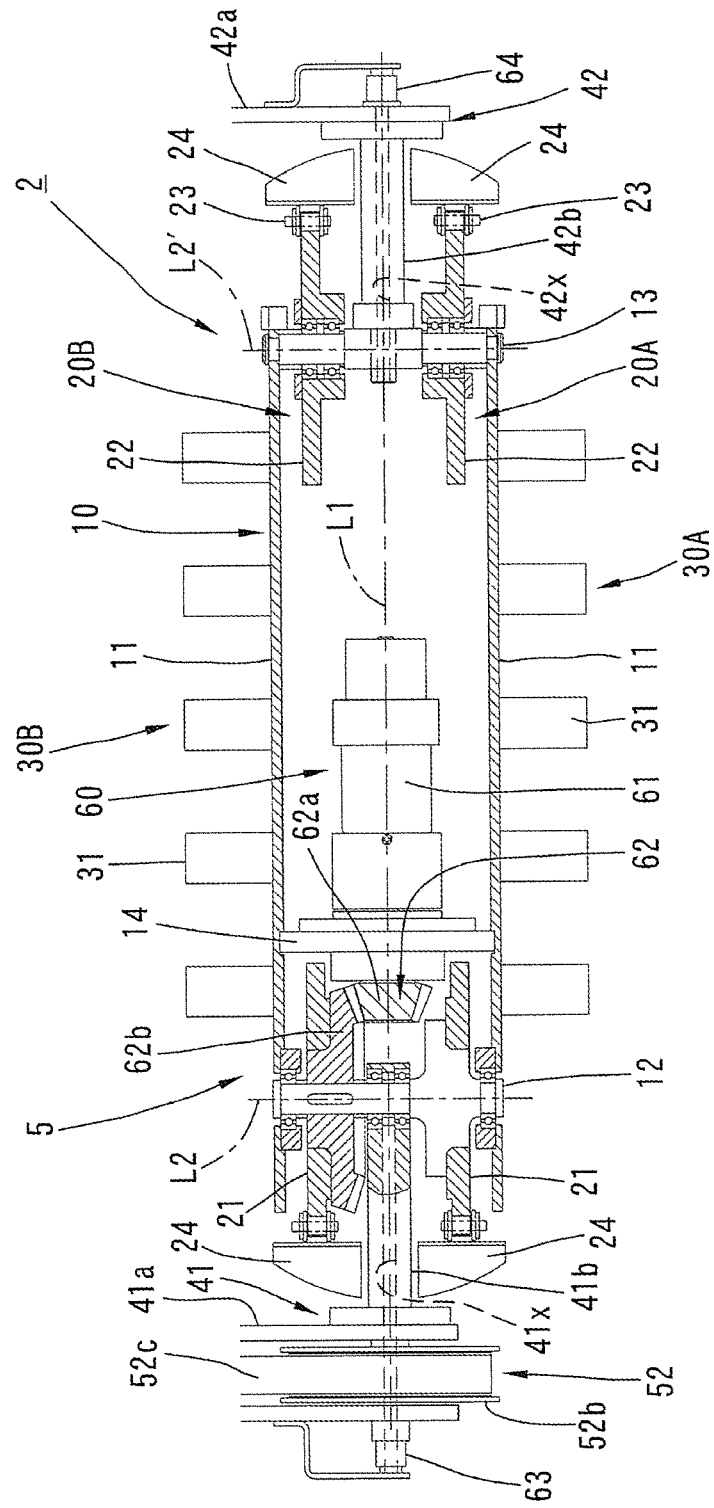
FIG. 5 is a longitudinal sectional view of the crawler device.

As shown in FIG. 5, the crawler unit 5 includes a first support 10 extending along the first rotational axis L1, a pair of crawler structures 20A, 20B mounted on the first support 10 and a pair of ground contacting structures 30A, 30B mounted on the first support 10.

The first support 10 includes a pair of side plates 11 extending in parallel to each other in a direction of the first rotational axis L1. The side plates 11 are spaced from and opposed to each other with the first rotational axis L1 extending therebetween. The first support 10 also includes a driver shaft 12 rotatably connected to one end portions of the side plates 11, a driven shaft 13 connected to the other end portions of the side plates 11 and a fixed plate 14 fixed to intermediate portions of the side plates 11.

Central axes L2, L2' of the driver shaft 12 and the driven shaft 13 extend in parallel to each other in a direction in which the pair of side plates 11 are opposed to each other, which direction being orthogonal to the first rotational axis L1. The central axes L2, L2' are respectively provided as rotational axes (second rotational axes) of sprocket wheels 21, 22 to be described later.

The pair of crawler structures 20A, 20B are disposed between the pair of side plates 11 of the first support 10. The crawler structures 20A, 20B are spaced from and opposed to each other with the first rotational axis L1 extending therebetween. Each of the crawler structures 20A, 20B includes the pair of sprocket wheels 21, 22 (wheels) spaced from each other in the direction of the first rotational axis L1, a chain 23 (endless elongated member) wrapped around the sprocket wheels 21, 22 and a lot of tread lugs 24 attached to the chain 23.

The sprocket wheel 21 of the crawler structure 20A is directly fixed to the driver shaft 12 and the sprocket wheel 21 of the crawler structure 20B is fixed to the driver shaft 12 via a bevel gear 62b to be described later. The other sprocket wheel 22 of the crawler structures 20A, 20B are rotatably supported by the driven shaft 13.

Figure 6:
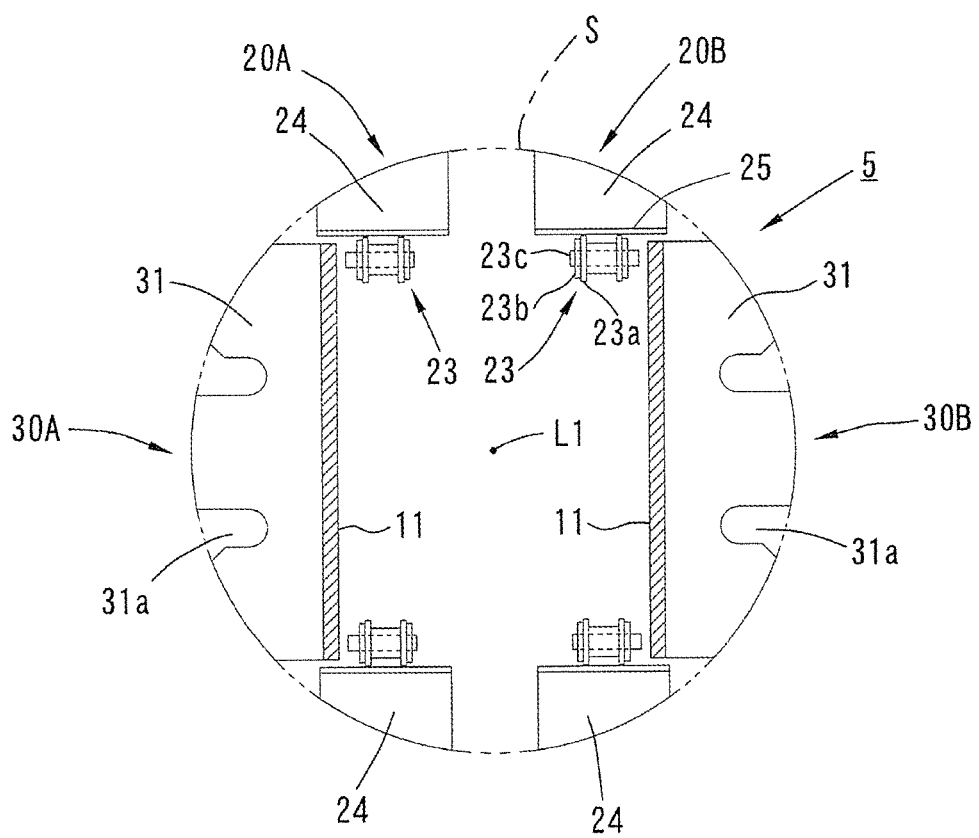
FIG. 6 is a cross-sectional view taken along line D-D of FIG. 3.

As shown in FIG. 6, the chain 23 is composed of pairs of inner links 23a and pairs of outer links 23b alternately disposed in a circumferential direction and connected to each other by connecting pins 23c. Torque is transmitted between the wheels 21, 22 through engagement of large diameter central portions of the pins 23c and engagement recesses spacedly formed in outer peripheries of the sprocket wheels 21, 22.

The tread lugs 24 are made of rubber, for example, and fixed to the chain 23 at even intervals. Specifically, fixing plates 25 are welded to the pairs of inner links 23a of the chain 23 and the other fixing plates 25 are welded to the pairs of outer links 23b. The tread lugs 24 are fixed to these fixing plates 25. Two bolts pass through the tread lugs 24 and the fixing plates 25 and nuts are threadedly engaged with distal end portions of the bolts protruded from the fixing plates 25. Countersunk holes are formed in outer surfaces of the tread lugs 24 and heads of the bolts are received in the countersunk holes.

The pair of ground contacting structures 30A, 30B are disposed outside of the pair crawler structures 20A, 20B in a direction in which the pair of crawler structures 20A, 20B are opposed to each other (direction of the second rotational axes L2, L2').

Each of the pair of ground contacting structures 30A, 30B includes a plurality (five in this embodiment) of ground contacting plates 31 (ground contacting members) spacedly arranged in the direction of the first rotational axis L1. The ground contacting plates 31 are made of rubber, for example, and fixed to outer surfaces of the side plates 11 at right angles with the side plates 11. The ground contacting plates 31 are protruded outside of the crawler structures 20A, 20B in the direction of the second rotational axes L2, L2'.

As shown in FIG. 6, outer surfaces of the ground contacting lugs 24 constituting portions of the crawler structures 20A, 20B have circular-arc configurations corresponding to an imaginary circular cylindrical surface S about the first rotational axis L1. When the tread lugs 24 are positioned between the wheels 21, 22, the outer surfaces of the tread lugs 24 are positioned on the imaginary circular cylindrical surface S.

As shown in FIG. 6, outer surfaces of the ground contacting plates 31 also have circular-arc configurations along the imaginary circular cylindrical surface S. As a result, the outer surfaces of the tread lugs 24 of the pair of the crawler structures 20A, 20B and the outer surfaces of the ground contacting plates 31 of the pair of ground contacting structures 30A, 30B cooperate to provide an outer periphery of the crawler unit 5 with a circular cylindrical configuration.

Recesses 31a are formed in the outer surfaces of the ground contacting plates 31.

As shown in FIG. 2, the outer periphery of the crawler unit 5 includes first zones Z1 occupied by the pair of crawler structures 20A, 20B and second zones Z2 occupied by the ground contacting structures 30A, 30B alternately arranged in the circumferential direction. Provision of the ground contacting structures 30A, 30B enables an angular range of the first zone Z1 occupied by the ground contacting lugs 24 of the pair of crawler structures 20A, 20B to be reduced. The angular range of the first zone Z1 may not be greater than 120 degrees, and preferably, not greater than 90 degrees.

Figure 3:
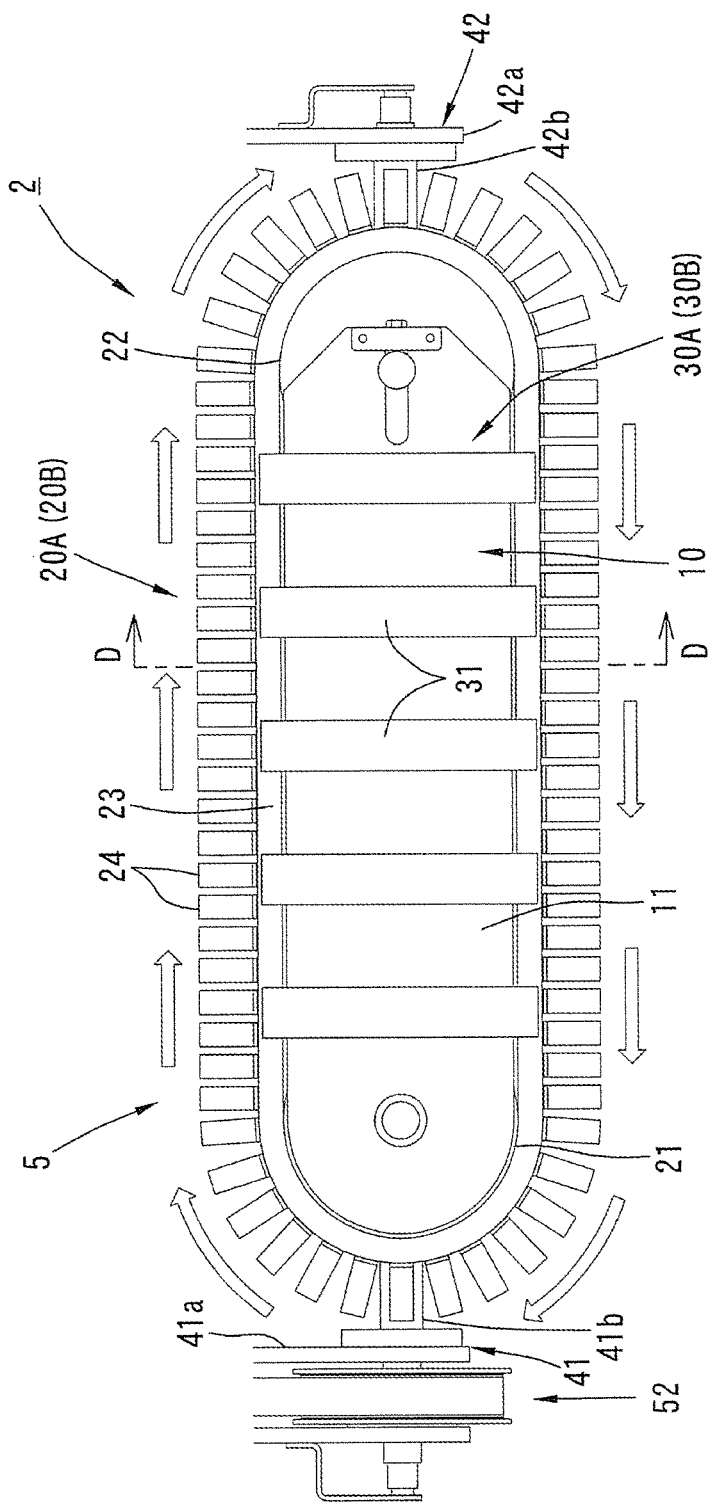
FIG. 3 is a side view of the crawler device of FIG. 1 viewed from a direction of arrow B.

As shown in FIGS. 3 to 5, opposite end portions of the crawler unit 5 are supported by a pair of second supports 41, 42 such that the crawler unit 5 is rotatable about the first rotational axis L1. A detailed description thereof is given below.

The pair of second supports 41, 42 respectively include bases 41a, 42a and shafts 41b, 42b. The bases 41a, 42a are disposed away from each other in the direction of the first rotational axis L1 with the crawler unit 5 disposed therebetween. The bases 41a, 42a are fixed to the under surface of the robot body 1. The shafts 41b, 42b are disposed along the first rotational axis L1 and are respectively rotatably supported by the bases 41a, 42a. The shaft 41b is provided as a torque transmitting member as will be described later.

The shaft 41b extends to an inside of the crawler unit 5 via a gap between one end portions of the pair of crawler structures 20A, 20B. A distal end portion of the shaft 41b is connected to the driver shaft 12 of the first support 10. In this connected states, the shaft 41b and the driver shaft 12 are not allowed to be relatively rotated about the first rotational axis L1, but allowed to be rotated about the second rotational axis L2 of the driver shaft 12.

The support shaft 42b extends to the inside of the crawler unit 5 via a gap between the other end portions of the pair of crawler structures 20A, 20B. A distal end portion of the support shaft 42b is connected to the driven shaft 13 of the first support 10. The support shaft may be fixed to the base 42a and rotatably connected to the driven shaft 13.

As shown in FIGS. 3 to 5, the crawler unit 5 is rotated about the first rotational axis L1 by a rolling actuator 50. The rolling actuator 50 includes a motor 51 fixed to the base 41a and a torque transmitting mechanism 52 that transmits a rotary torque of the motor 51 to the shaft 41b. The motor 51 can be rotated in normal and reverse directions.

The torque transmitting mechanism 52 includes a timing pulley 52a fixed to an output shaft of the motor 51, a timing pulley 52b fixed to the shaft 41b and a timing belt 52c wrapped around the timing pulleys 52a, 52b.

As shown in FIG. 5, the pair of crawler structures 20A, 20B are rotationally driven by a crawler actuator 60 disposed inside of the crawler unit 5. The crawler actuator 60 includes a motor 61 fixed to the fixed plate 14 of the first support 10 and a torque transmitting mechanism 62 that transmits a rotational torque of the motor 61 to the wheel 21 of the crawler structures 20A, 20B. The torque transmitting mechanism 62 includes a bevel gear 62a fixed to an output shaft of the motor 61 and a bevel gear 62b fixed to the driver shaft 12 and engageable with the bevel gear 62a. The rotary torque of the motor 61 is transmitted to the wheel 21 of the crawler structure 20B via the bevel gears 62a, 62b, and transmitted to the wheel 21 of the crawler structure 20A via the driver shat 12. Thereby, the crawler structures 20A, 20B are driven at the same time at the same speed in the same direction.

One of two power cords (not shown) connected to the motor 61 is connected to a rotary joint 63 provided at the base 41a via a hole 41x formed in the shaft 41b. The other of the power cords is connected to a rotary joint 64 provided at the base 42a via a hole 42x formed in the support shaft 42b. The rotary joints 63, 64 are connected to a battery mounted on the robot body 1 via a power cord that is not shown.

When the motors 51 of the rolling actuators 50 of the pair of crawler devices 2 are driven, the crawler units 5 are rotated (rolling) about the first rotational axis L1, and thereby the robot can be moved in the direction Y (moving by rolling).

When the motors 61 of the crawler actuators 60 of the pair of crawler devices 2 are driven, the crawler structures 20A, 20B of the two crawler devices 2 are rotated, and thereby the robot can be moved in the direction X (crawler moving). During the crawler moving, it is required that the first zone Z1 of the crawler units 5 should be contacted with the ground. It is because the crawler structures 20A, 20B will turn idly if the motors 61 are driven with the second zone Z2 contacted with the ground.

By switching from being driven by one of the motors 51, 61 to the other of the motors 51, 61, an orientation of the robot body 1 can be changed 90 degrees from the direction X to the direction Y or from the direction Y to the direction X without pivoting.

Moreover, the robot can also be moved linearly in an oblique direction by being driven by both of the motors 51, 61 at the same time and controlling speed and direction of rotation of the motors.

While the crawler unit 5 is rolling, the first zones Z1 occupied by the tread lugs 24 of the crawler structures 20A, 20B and the second zones Z2 occupied by the ground contacting plates 31 of the ground contacting structure 30A, 30B are alternately contacted with the ground, thereby alternately bearing the load. Since the angular range of the first zone Z1 can be reduced by a range over which the second zone Z2 is provided, a dimension of the pair of crawler structures 20A, 20B in the circumferential direction, more specifically, a dimension of the tread lugs 24 in the circumferential direction can be reduced. As a result, the tread lugs 24 can be securely supported by the chain 23. Moreover, since too much bending load is not applied to the tread lugs 24 and the chain 23, durability and load bearing ability of the crawler structures 20A, 20B can be enhanced.

The robot can be moved forward and rearward by the rolling of the crawler units 5. Since the ground contacting plates 31 have the recesses 31a, when the robot is to be moved over obstacles, the crawler units 5 can catch the obstacles with the recesses 31a without being slid with respect to the obstacles, and thus the robot can be moved over the obstacles.

A second embodiment of the present invention will be described hereinafter with reference to FIGS. 7 to 10. In the description of the second embodiment, same or similar reference numerals are used for features corresponding to those of the first embodiment, and detailed description thereof will be omitted. Directions X and Y are defined in FIG. 7.

Figure 7:
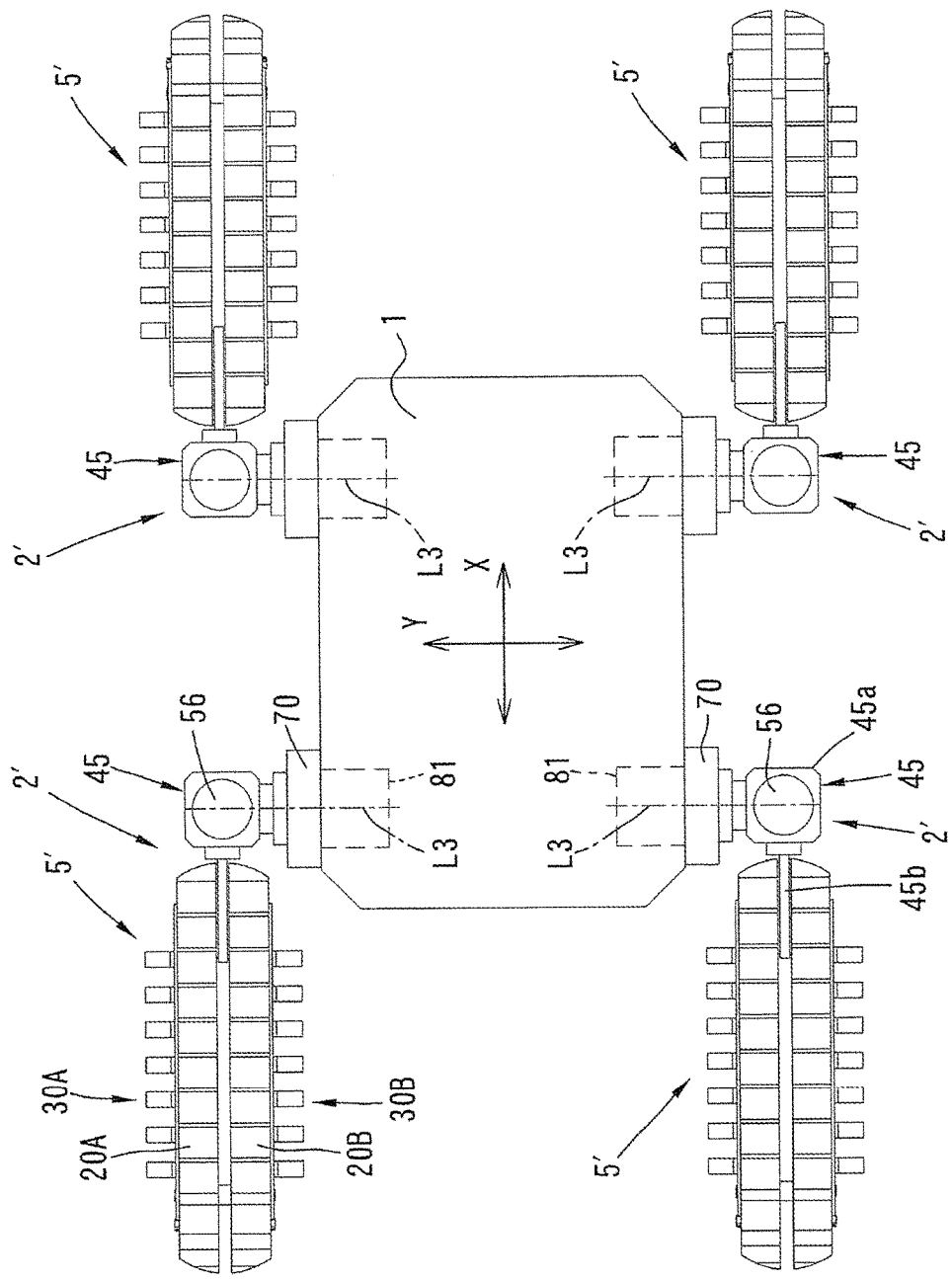
FIG. 7 is a plan view of a robot (traveling apparatus) having crawler devices according to a second embodiment of the present invention incorporated therein.
Figure 8:
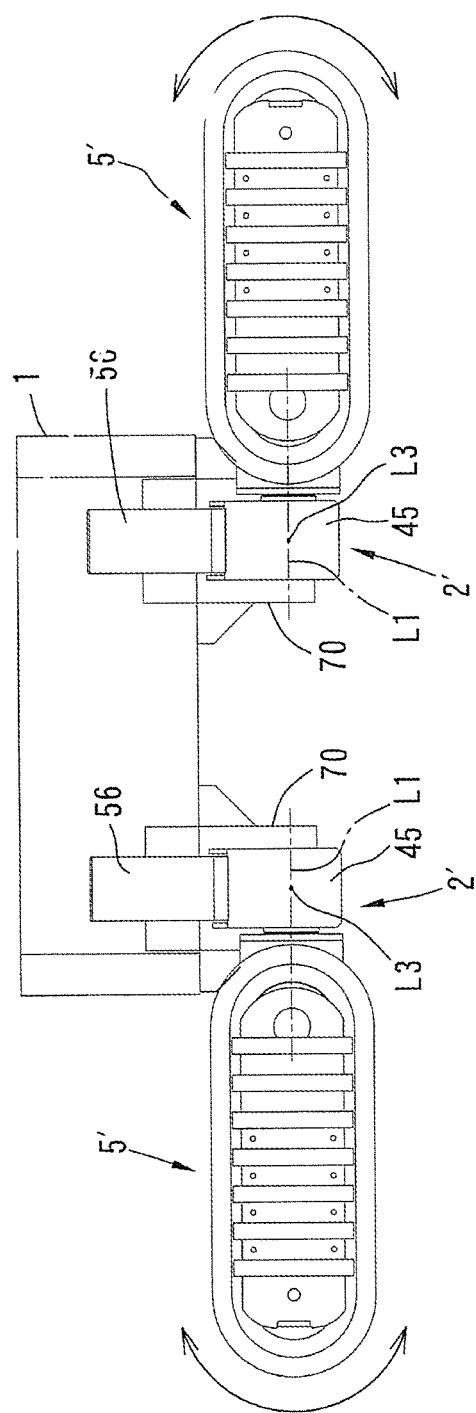
FIG. 8 is a side view of the robot according to the second embodiment.

As shown in FIGS. 7 and 8, a robot (traveling apparatus) includes two pairs of flipper-type crawler devices 2' mounted to a robot body 1 (body of the traveling apparatus).

One pair of crawler devices 2', 2' and the other pair of crawler devices 2', 2' are spaced from each other in the direction X (direction of a first rotational axis L1). The crawler devices 2', 2' of each pair are spaced from each other in the direction Y (direction orthogonal to the first rotational axis L1).

In the crawler device 2' of the second embodiment, one end portion of the crawler unit 5' is supported by a second support 45, with the other end portion of the crawler unit 5' being a free end.

Figure 9:
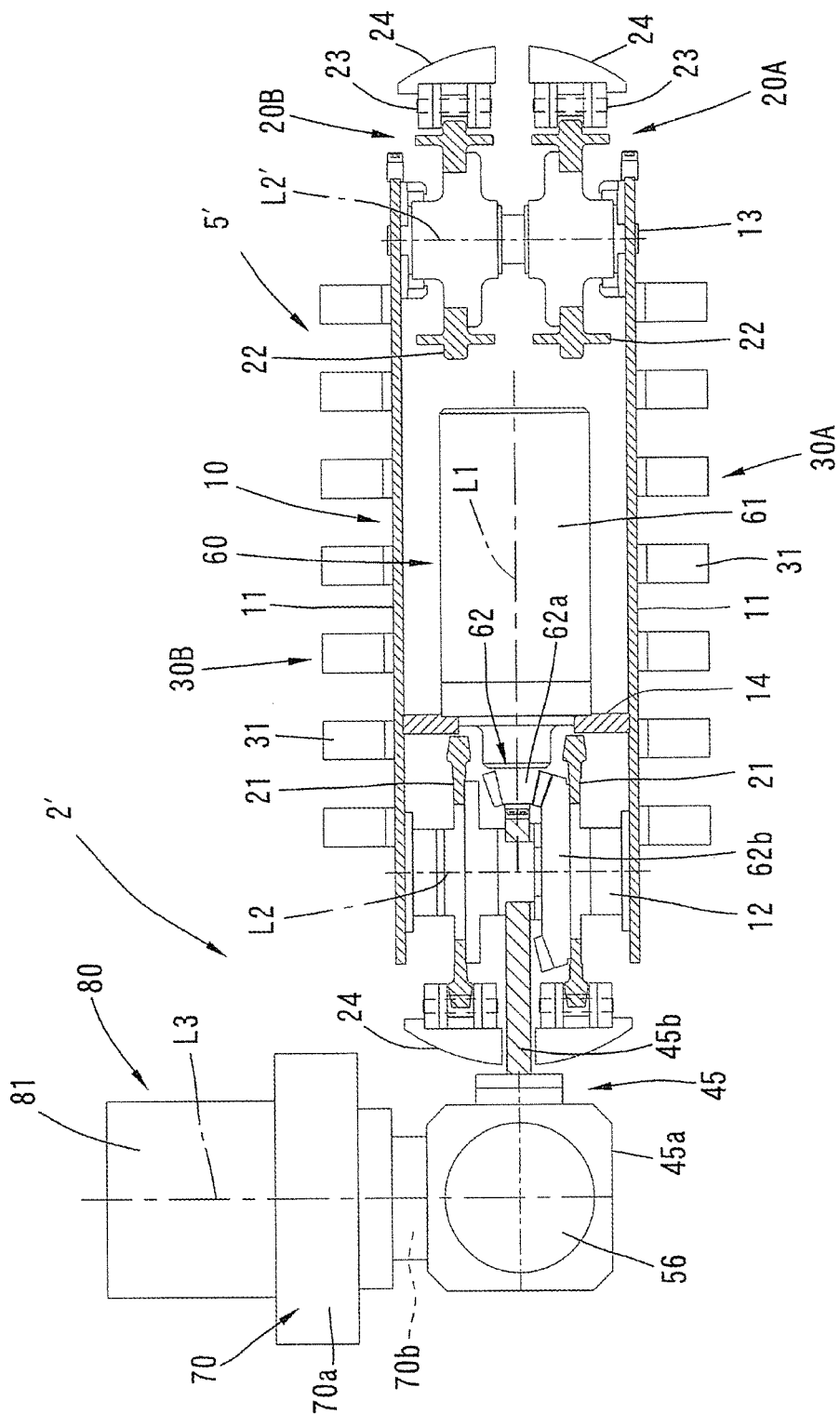
FIG. 9 is a sectional plan view of the crawler device according to the second embodiment.
Figure 10:
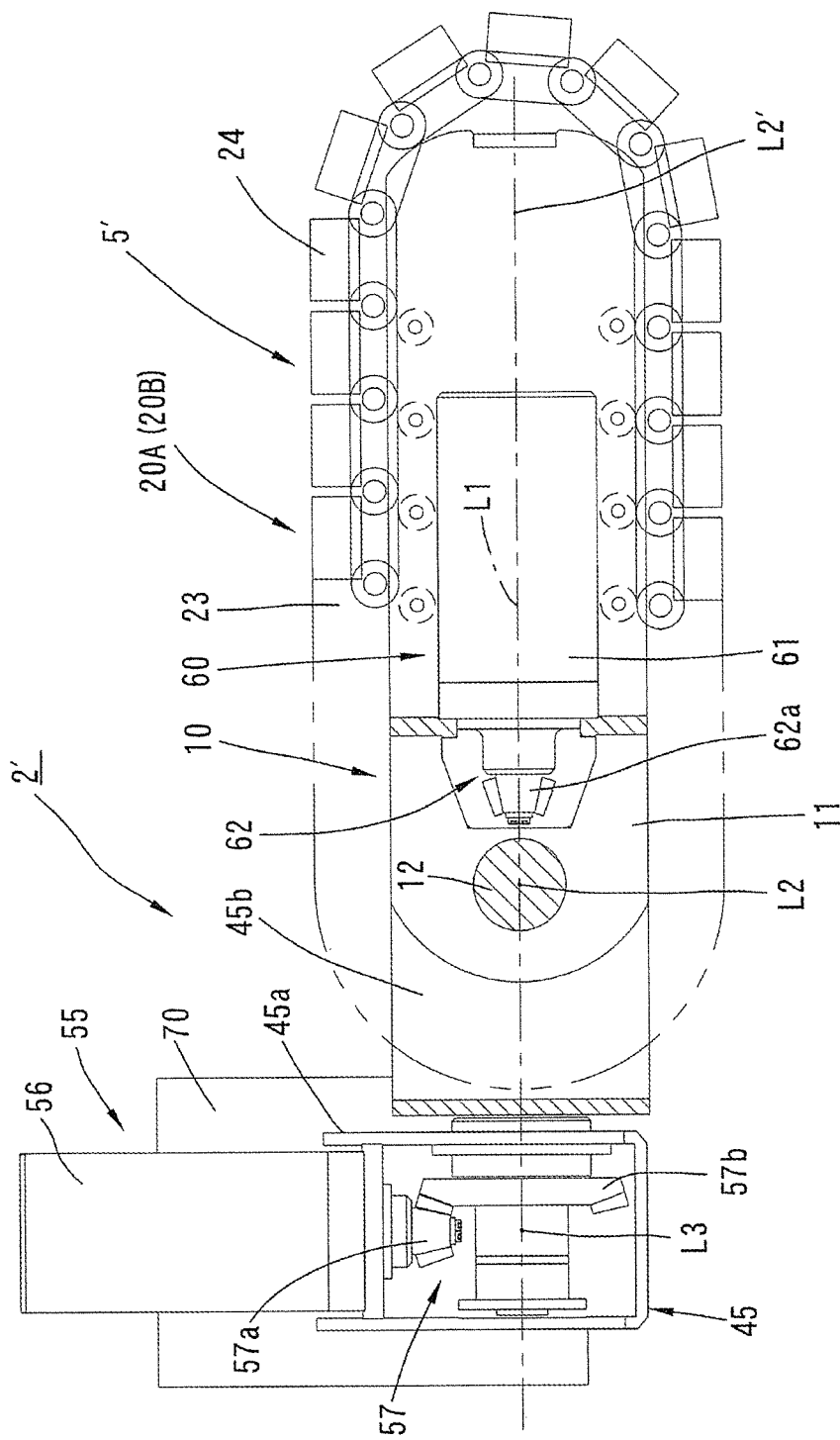
FIG. 10 is a sectional side view of the crawler device according to the second embodiment.

As shown in FIGS. 9 and 10, the second support 45 includes a base 45a having a shape of a box and a torque transmitting member 45b having a shape of a plate supported by the base 45a such that the torque transmitting member 45b is rotatable about the first rotational axis L1. The torque transmitting member 45b is connected to a driver shaft 12 of a first support 10 through a gap between one end portions of crawler structures 20A, 20B. The torque transmitting member 45b is not allowed to be relatively rotated about the first rotational axis L1 with respect to the driver shaft 12. In the connected state, the driver shaft 12 is allowed to be rotated about a second rotational axis L2.

As shown in FIG. 10, a rolling actuator 55 includes a motor 56 fixed to the base 45a of the second support 45 and a torque transmitting mechanism 57 that transmits a rotary torque of the motor 56 to the first support 10 via the torque transmitting member 45b. The torque transmitting mechanism 57 includes bevel gears 57a, 57b disposed in the base 45a and engageable with each other. The bevel gear 57a is fixed to an output shaft of the motor 56 and the bevel gear 57b is fixed to a shaft portion of the torque transmitting member 45b.

As with the first embodiment, the torque of the motor 56 is transmitted to the crawler unit 5' via the torque transmitting mechanism 57 and the torque transmitting member 45b, and the crawler unit 5' is rotated about the first rotational axis L1.

As shown in FIGS. 7 and 9, the second support 45 is supported by the robot body 1 via a third support 70 such that the second support 45 is rotatable about a third rotational axis L3. Specifically, the third support 70 includes a base 70a fixed to a side surface of the robot body 1 and a torque transmitting member 70b supported by the base 70a such that the torque transmitting member 70b is rotatable about the third rotational axis L3. The base 45a of the second support 45 is fixed to the torque transmitting member 70b.

The third rotational axis L3 extends in the direction Y defined in FIG. 7. The third rotational axes L3 of the pair of crawler devices 2' opposed to each other in the direction Y are on a same straight line.

The torque transmitting member 70b and the second support 45 are rotated in normal and reverse directions about the third rotational axis L3 by a flipper actuator 80 including a motor 81 disposed on the third support 70. Thereby, the crawler unit 5' is rotated 180 degrees in a vertical direction as indicated by arrows in FIG. 8. When the robot is moved forward and encounters an obstacle, the robot can be easily moved over the obstacle owing to the rotation of the crawler unit 5.

In the embodiment described above, the crawler units 5, 5' may be provided with an anchor mechanism. The anchor mechanism may include a claw rotatably supported by the first support 10 or the ground contacting plate 31 and an actuator that actuates the claw to be protruded outward from and to retreat within the imaginary circular cylindrical surface S. When the robot is used for exploration of marine resources, the claw is extended to dig into the ground to maintain the attitude of the robot during coring of the ground.

The present invention is not limited to the embodiments described above, and various modifications may be adopted.

Requirements for the outer periphery of the crawler unit formed by cooperation of the outer surfaces of the tread lugs of the pair of crawler structures and the outer surfaces of the ground contacting structures is to have a substantially circular cylindrical configuration that allows for the rolling. Specifically, the outer periphery of the crawler unit is not required to have a smooth circular cylindrical surface. The outer periphery may be uneven. The outer surfaces of the tread lugs and the outer surfaces of the ground contacting plates are not required to be circular-arc surfaces along the imaginary circular cylindrical surface about the first rotational axis.

The crawler structure may be composed of a pair of wheels and a belt that is wrapped around the wheels and engageable with an outer periphery of the wheels by friction or by pins.

The ground contacting structure may be composed of a single ground contacting member.

It is not required to perform the oblique moving in which the crawler actuator and the rolling actuator are driven at the same time.

The motor of the crawler actuator may be disposed outside of the crawler unit. If this arrangement is applied to the first embodiment, for example, the motor 61 may be fixed to the base 42a outside of the crawler unit 5. The support shaft 42b may extend inside the crawler unit 5, an inner end of the support shaft 42b may be fixed to the bevel gear 62a and an outer end of the support shaft 42b may be connected to the motor 61.

The present invention may also be applied to traveling apparatuses other than the robot, such as a cart for carrying baggage, for example. If the cart is pushed by hand, all of the actuators may be omitted. In this case, the torque transmitting member of the second support is provided simply as a support member for rotatably supporting the first support.

INDUSTRIAL APPLICABILITY

The present invention may be applied to a crawler device mounted on a traveling apparatus such as a robot.

The invention claimed is:

1. A crawler device comprising:
    a crawler unit including a first support extending along a first rotational axis and a pair of crawler structures extending in a direction of the first rotational axis and disposed on the first support, the crawler structures opposed to each other with the first rotational axis extending therebetween; and
    at least one second support supporting the crawler unit such that the crawler unit is rotatable about the first rotational axis,
    wherein the crawler unit further comprises a pair of ground contacting structures disposed on the first support;
    the pair of ground contacting structures are disposed outside of the pair of crawler structures in a direction in which the pair of crawler structures are opposed to each other;
    the pair of crawler structures and the pair of ground contacting structures cooperate to provide the crawler unit with a circular cylindrical configuration about the first rotational axis; and
    an outer periphery of the crawler unit has first zones occupied by the pair of crawler structures and second zones occupied by the pair of ground contacting structures, the first zones and the second zones alternately arranged in a circumferential direction.

2. The crawler device according to claim 1, wherein
    each of the pair of crawler structures includes a pair of wheels spaced from each other in the direction of the first rotational axis, an endless elongated member wrapped around the pair of wheels and a multitude of tread lugs attached to the endless elongated member,
    the pair of wheels are supported by the first support such that the wheels are respectively rotatable about second rotational axes extending parallel to each other in a direction orthogonal to the first rotational axis, the pair of crawler structures opposed to each other in the direction of the second rotational axes, and outer surfaces of the tread lugs and outer surfaces of the ground contacting structures cooperate to provide the crawler unit with a circular cylindrical outer periphery.

3. The crawler device according to claim 1, wherein
the first support includes a pair of side plates opposed to each other with the first rotational axis extending therebetween, the pair of crawler structures are disposed between the pair of side plates, and one or a plurality of ground contacting members constituting the ground contacting structures are fixed to outer surfaces of the pair of side plates.

4. The crawler device according to claim 3, wherein
the plurality of ground contacting members are arranged spaced from one another in the direction of the first rotational axis, and an outer surface of each of the ground contacting members includes a circular-arc surface about the first rotational axis.

5. The crawler device according to claim 4, wherein a recess is formed in the outer surface of the ground contacting member.

6. The crawler device according to claim 1, wherein
a pair of second supports are provided spaced from each other in the direction of the first rotational axis, and the crawler unit is rotatably supported by the pair of second supports at opposite end portions of the crawler unit.

7. The crawler device according to claim 6, wherein
of the pair of second supports, one second support that supports one end portion of the crawler unit includes a base and a torque transmitting member supported by the base such that the torque transmitting member is rotatable about the first rotational axis, the torque transmitting member is connected to the first support such that the torque transmitting member is not rotatable about the first rotational axis relative to the first support, and the crawler device further comprises a rolling actuator that rotationally drives the torque transmitting member of the one second support and a crawler actuator that rotationally drives the pair of crawler structures at the same time in the same direction.

8. The crawler device according to claim 1, wherein
the crawler unit is supported by the second support only at one end portion of the crawler unit, the second support includes a base and a torque transmitting member supported by the base such that the torque transmitting member is rotatable about the first rotational axis, the torque transmitting member is connected to the first support such that the torque transmitting member is not rotatable about the first rotational axis relative to the first support, and the crawler device further comprises a rolling actuator that rotationally drives the torque transmitting member of the second support and a crawler actuator that rotationally drives the pair of crawler structures at the same time in the same direction.

9. The crawler device according to claim 8, further comprising:
a third support that supports the second support such that the second support is rotatable about a third rotational axis that is orthogonal to the first rotational axis; and a flipper actuator that rotationally drives the second support.

10. A traveling apparatus comprising:
a body: and
at least one pair of the crawler devices according to claim 7, wherein the crawler units of the pair of crawler devices are disposed parallel to each other and spaced from each other in a direction orthogonal to the first rotational axis, and the pair of second supports of each of the crawler devices are supported by the body.

11. A traveling apparatus comprising:
a body: and
two pairs of the crawler devices according to claim 9, wherein one pair of crawler devices and the other pair of crawler devices are spaced from each other in the direction of the first rotational axis, the crawler devices of each of the pair of crawler devices are spaced from each other in a direction orthogonal to the first rotational axis, the third rotational axes of the pair of crawler devices are arranged along a same line, and the third support of each of the crawler devices is supported by the body.

* * * * *